United States Patent [19]
Way

[11] Patent Number: 5,678,464
[45] Date of Patent: Oct. 21, 1997

[54] PORTABLE LATHE WITH PUSH ROD ACTUATED RACK AND PINION FEED

[75] Inventor: Arlan W. Way, Gladstone, Oreg.

[73] Assignee: Climax Portable Machine Tools, Inc., Newberg, Oreg.

[21] Appl. No.: 627,505

[22] Filed: Apr. 4, 1996

[51] Int. Cl.⁶ ............................................... B23B 5/04
[52] U.S. Cl. ................................... 82/113; 82/128
[58] Field of Search ........................... 82/113, 62–66, 82/72–74, 70.2, 128; 408/132, 135

[56] References Cited

U.S. PATENT DOCUMENTS

| | | |
|---|---|---|
| 3,908,491 | 9/1975 | Gilmore ............................. 82/113 |
| 4,186,630 | 2/1980 | Lindhag . |
| 4,259,885 | 4/1981 | Lindhag . |
| 4,314,491 | 2/1982 | Hartmann et al. . |
| 4,411,178 | 10/1983 | Wachs et al. . |
| 4,677,884 | 7/1987 | Kwech et al. . |
| 4,852,435 | 8/1989 | Hunt . |
| 5,005,453 | 4/1991 | Röhm . |
| 5,197,362 | 3/1993 | Birkestrand .......................... 82/113 |

*Primary Examiner*—Steven C. Bishop
*Attorney, Agent, or Firm*—Dellett and Walters

[57] ABSTRACT

A portable lathe is modular in construction and provides a cutting tool having a variable feed rate. The mechanism comprises a cam member that imparts linear motion to a series of push rods that in turn pivot a clutch mechanism to activate a rack-and-pinion drive mechanism that effects movement of the cutting tool. A feed rate adjustment knob controls pivotal movement of the clutch mechanism so as to allow variability of the feed rate. Spacer blocks including push rods therein allow use of the mechanism to turn a variety of surface sizes.

25 Claims, 7 Drawing Sheets

PORTABLE LATHE WITH PUSH ROD ACTUATED RACK AND PINION FEED

The present invention relates to end shaft turning machines and more particularly to a portable end shaft turning machine that is compact in construction and is adapted for use in machining surfaces of both large and small sized work pieces.

BACKGROUND OF THE INVENTION

Use of a portable end shaft turning machine, either in the field or in a shop, for performing a variety of machining operations on a shaft is well known in the art. The end shaft turning machine typically is mounted to the end of a shaft by means of a mounting flange and mounting bolts. A central spindle extends outwardly from the shaft and supports a frame or housing and a rotatable tool head mounted thereon. The tool head is typically rotated by means of a motor, such as an electric, hydraulic or air motor.

To machine a surface of the shaft, the cutting tool is rotated over the surface and is moved incrementally along the surface to cut away an incremental amount of surface material. Many prior art turning machines typically require manual operation of such incremental cutting tool advancement. Furthermore, as shown in U.S. Pat. No. 4,677,882 (Kwech et al), prior art end shaft turning machines are typically large in size and require a substantial amount of space adjacent the turning surface for installation of the device. Moreover, prior art lathes are typically adaptable to turn surfaces in only a limited range of sizes.

SUMMARY OF THE INVENTION

Accordingly, it is an object of the present invention to provide an improved end shaft turning machine which is compact in construction.

It is another object of the present invention to provide an improved end shaft turning machine adaptable to machine work pieces in a variety of sizes.

It is a further object of the present invention to provide an improved feed drive mechanism on an end shaft turning machine adapted for automatic feed of the cutting tool.

It is yet another object of the present invention to provide an improved end shaft turning machine with an improved feed drive mechanism having an adjustable feed rate of the cutting tool.

The present invention comprises a portable lathe or end shaft turning machine adapted for mounting on a work piece to be machined and includes a cutting tool which is mounted on an axially driven turning bar. The turning bar is advanced by a rack-and-pinion mechanism, the pinion being advanced by pivotal movement of a clutch mechanism. The clutch mechanism is pivoted by the upward and downward movement of push rods that engage a cam mechanism as the lathe body is rotated about a central spindle.

In a particular embodiment, the cam mechanism is a substantially cylindrical shaped stationary cam having a plurality of contact surfaces and being mounted on the central spindle that supports a motor for effecting rotational motion of the lathe. A plurality of push rods are mounted end-to-end inside the main lathe body such that rotation of the mechanism about the central spindle causes the central-most push rod to sequentially engage each of the contact surfaces of the cam mechanism. Such sequential engagement by the central most push rod causes the outermost push rod to move upwardly and downwardly along its linear axis, thereby repeatedly pivoting a clutch arm of the clutch mechanism. Such pivotal movement of the clutch arm advances the rack-and-pinion mechanism and thus advances the turning bar and the cutting tool mounted thereon. A feed adjustment mechanism may be manipulated to adjust the pivotal range of movement of the clutch arm, thereby adjusting the feed rate of the turning bar and the cutting tool.

In accordance with another aspect of the present invention, spacer blocks including push rods positioned therein may be mounted on the main body in order to permit facing of shafts having large diameters. Such facing of large diameter surfaces is accomplished by the movement of the spacer block push rod, which thereby imparts motion of the central most push rod to the outer most push rod.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figures 1, 4:
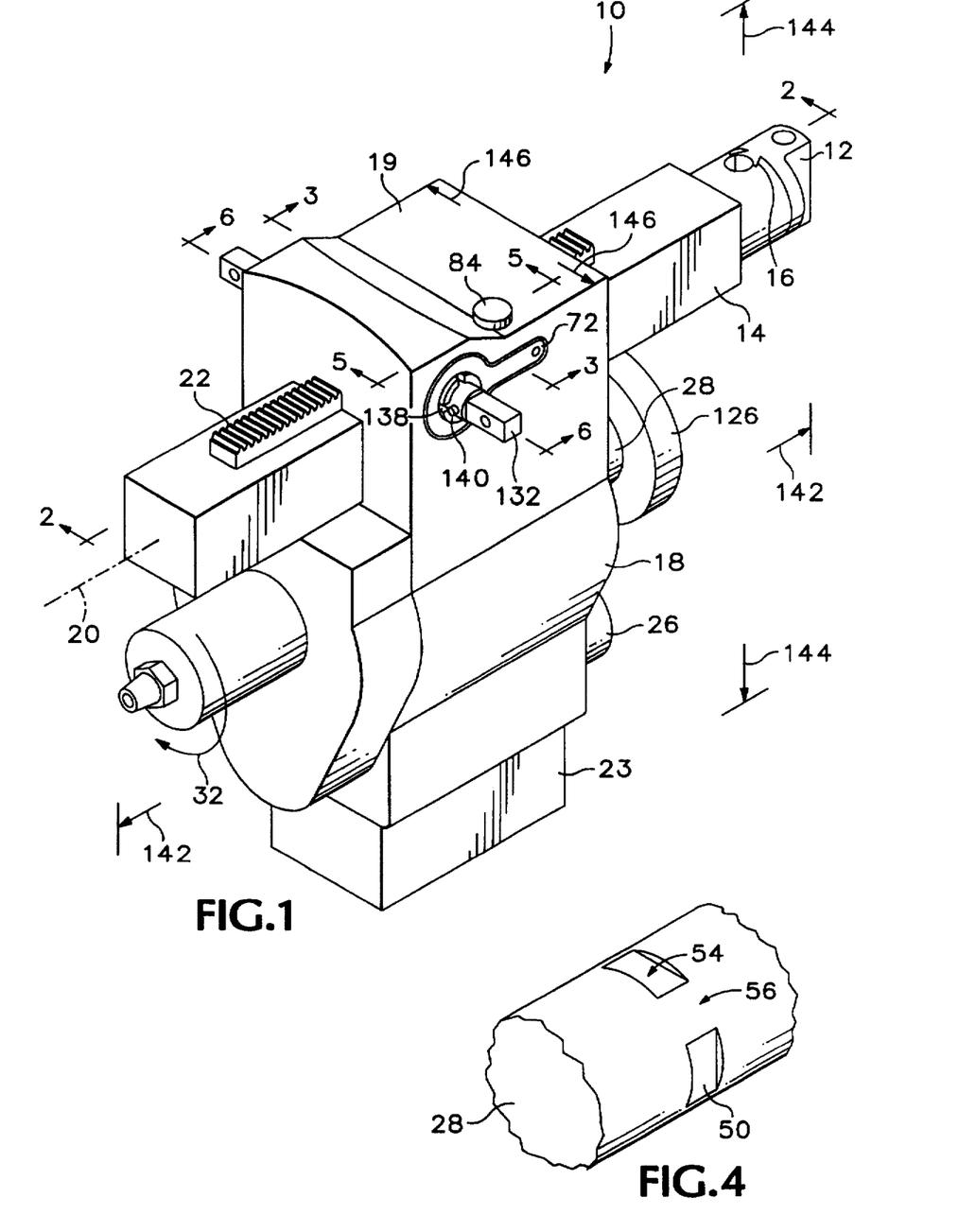
FIG. 1 is an isometric front view of a portable lathe according to the present invention.
FIG. 4 is a detailed isometric view of the cam mechanism shown in FIGS. 2 and 3.
Figure 2:
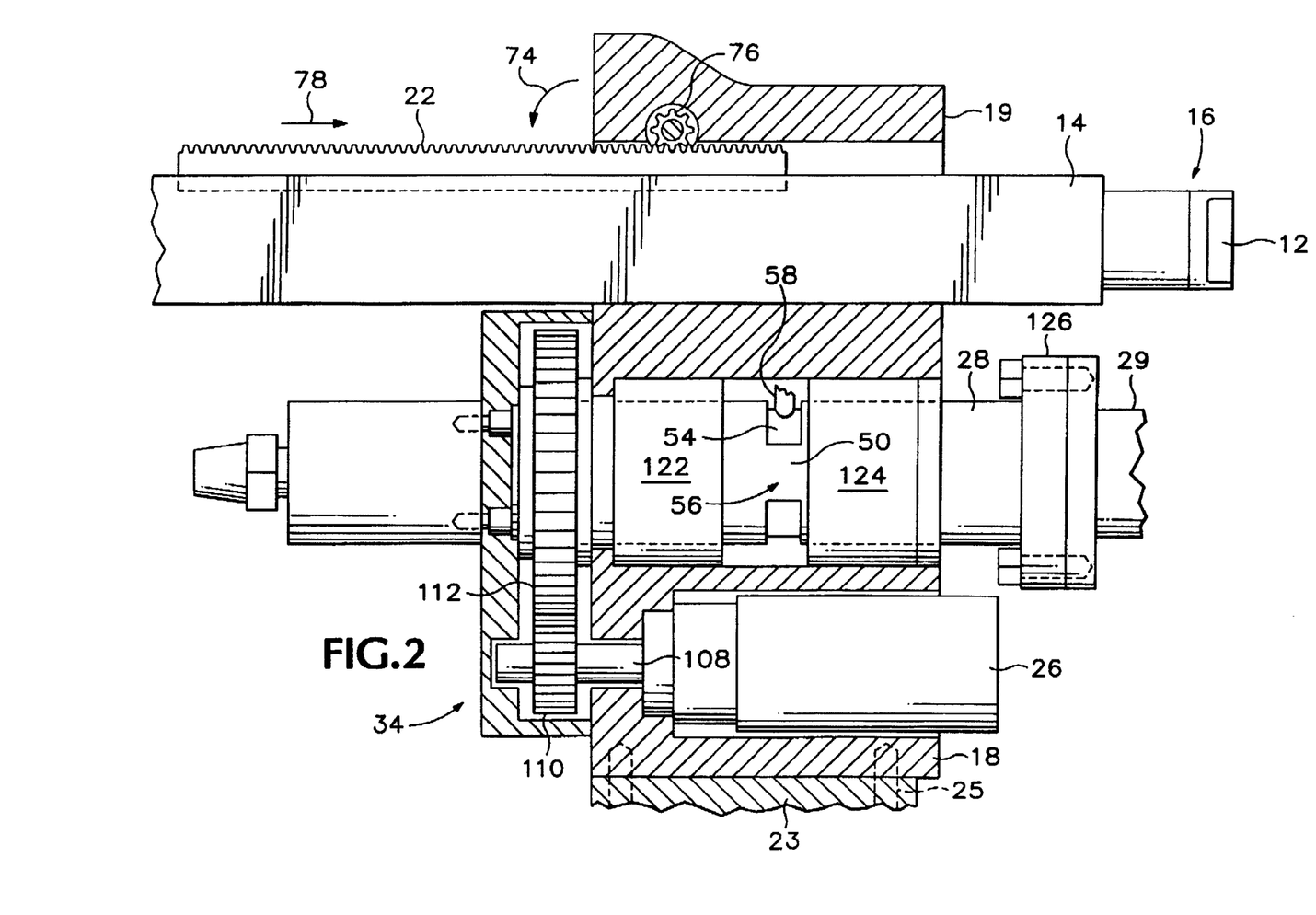
FIG. 2 is a partial cross-sectional side view of the lathe taken along line 2—2 of FIG. 1.

Referring to FIG. 1, an isometric front view of a portable lathe in accordance with the present invention, a portable lathe (also denoted end shaft turning machine) 10 comprises a turning head 12 adapted for receiving and holding a tool bit (not shown) and which is mounted to an axially driven turning bar 14 through use of a dovetail mounting configuration 16. Turning bar 14 extends through a bar support body 19 of lathe mechanism 10 and is adapted to extend and retract along a turning bar axis 20. Bar support body 19 sits on top of main body 18 and is secured thereto. A rack 22 is affixed to the top of bar 14 and is engaged by a pinion 76 (FIG. 2) as described hereinbelow. Lathe 10 also includes a counterweight 23 attached to main body 18 by mounting bolts 25 (FIG. 2). The counterweight maintains the apparatus in balance for precision surfacing operations. The lathe 10 is powered, for example, by an air motor 26 mounted on a spindle 28 that supports body 18. A mounting flange 126 is provided at one end of spindle 28 to enable the portable lathe to be secured to a shaft, by bolting or other suitable means. A corresponding flange is typically provided on the end of the shaft to be turned.

Referring to FIG. 2, a partial cross-sectional side view of the portable lathe taken along line 2—2 of FIG. 1, in a typical mounting relation to a shaft 29 which is to be turned, it may be observed that air motor 26 is mounted within the lathe body adjacent spindle 28 and includes a motor shaft 108 operatively connected to gear reduction mechanism 34. Gear reduction mechanism 34 includes a motor shaft gear 110 and a ring gear 112 which is secured about spindle 28. Bearings 122 and 124 mounted within the main body of the lathe enable rotational movement of the lathe body about spindle 28, as driven by operation of motor 26 and the engagement between gears 110 and 112. The mounting arrangement between flange 126 and the shaft 29 which is to be turned is accomplished by engagement of mounting flange 126 to a corresponding mating flange on the end of shaft 29. Flange 126 is secured to the flange of shaft 29, suitably by bolting. The lathe can alternatively bolt directly to shaft 29.

Referring to FIG. 2 together with FIG. 4, a detailed isometric view of a portion of spindle 28, a stationary cam member 50 is formed by machining four substantially flat trough regions 54, suitably spaced 90 degrees apart, into a portion of the spindle. Between regions 54, spindle regions 56 are not machined and suitably retain the original shape of the spindle.

Figure 3:
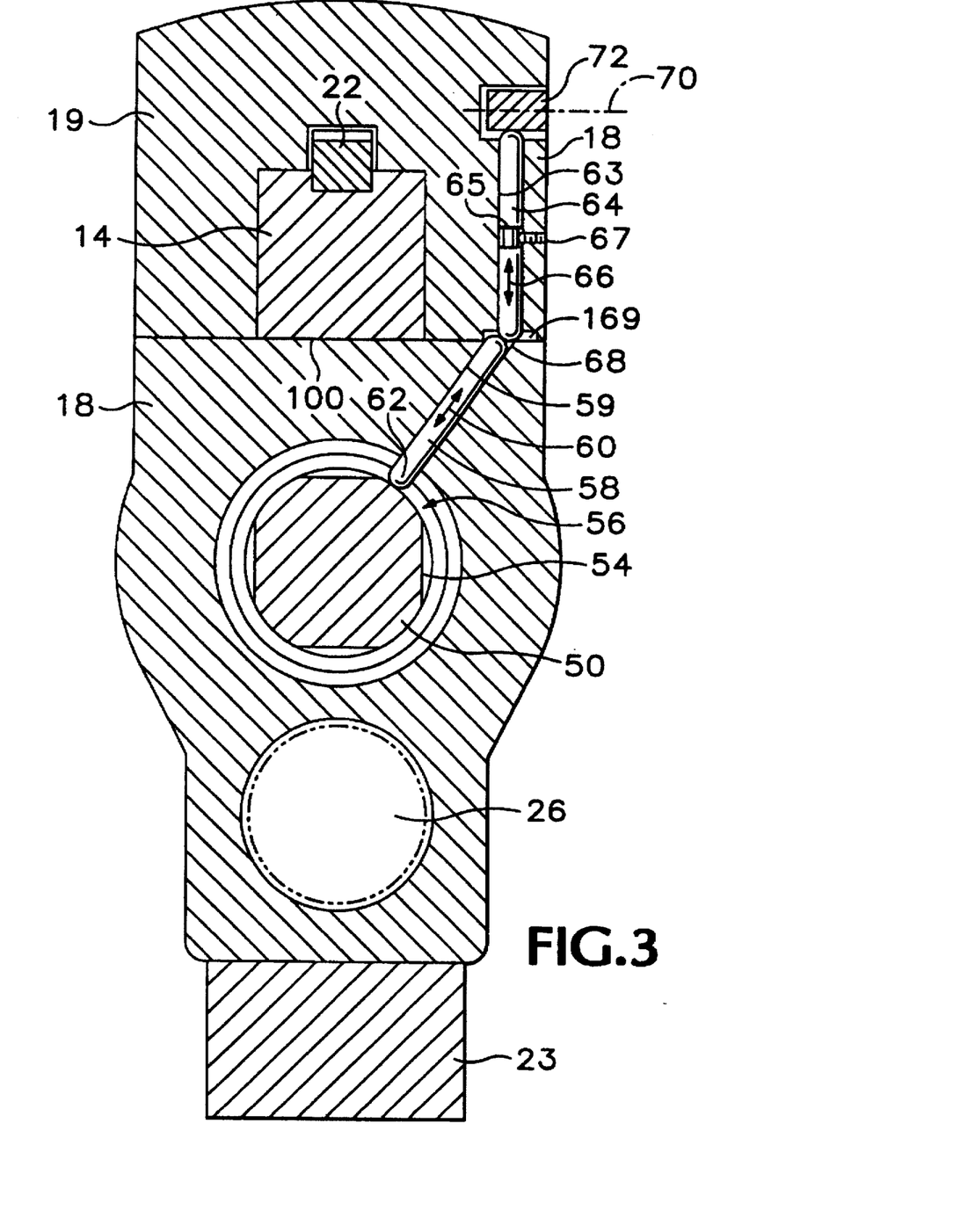
FIG. 3 is a cross-sectional front view of the portable lathe taken along line 3—3 of FIG. 1.

Referring to FIG. 3, a cross-sectional front view of the portable lathe of FIG. 1 taken along line 3—3, a first push rod 58 is centrally located within a bore 59 of main body 18, with one end 62 of the push rod in engagement with cam member 50. The push rod extends away from the cam member in angled fashion to an opening at the top of main body 18. A second push rod 64 is held within a substantially vertically aligned bore 63 within bar support body 19, with rod 64 engaging rod 58 within a recess 169 at the lowermost position of bore 63.

Upon operation of motor 26, main body 18 (as well as support body 19, turning bar 14 and Counterweight 23) will rotate about central spindle 28 in the direction of arc 32 (FIG. 1). During such rotation, spindle 28 suitably remains stationary.

Push rod 58 sequentially rides on the surface of the cam 50 as main body 18 rotates such that push rod 58 moves inwardly and outwardly along its axis of movement 60. Outward motion of rod 58, i.e., motion away from spindle 28, occurs as an end 62 of rod 58 rides on a region 56 of cam member 50. Inward motion of rod 58, i.e., motion toward spindle 28, occurs as end 62 passes off of region 56 and moves into trough region 54 of the cam contact surface. Inward and outward movement of rod 58 causes it to push against second push rod 64 held within the bore 63 of bar support body 19 such that push rod 58 effects upward and downward movement of rod 64 along its axis of movement 66.

Push rod 64 suitably includes a recessed central region 65 such that a set screw 67 retains the push rod within bore 63 of body 19. The length of recessed region 65 measured along axis 66 is preferably longer than the diameter of set screw 67 so as to permit a range of movement of push rod 64 along axis 66.

Figure 5:
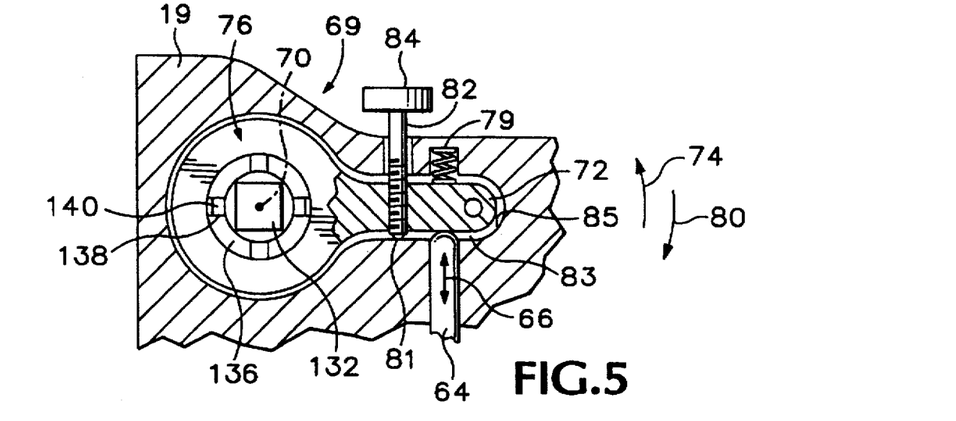
FIG. 5 is a partial cross-sectional side view taken along line 5—5 of FIG. 1 illustrating the clutch arm mechanism.

Referring now to FIG. 5, a partial cross-sectional view taken along line 5—5 of FIG. 1 illustrating further aspects of the clutch mechanism of the invention, a clutch mechanism 69 is contained within a cavity 85 defined in body 19. The clutch mechanism includes a clutch arm 72 which is pivotal about pivot axis 70. A pinion mechanism 76 is in driven engagement with clutch mechanism 69. Biasing spring 79 suitably urges clutch arm 72 downwardly (clockwise) in the direction of arrow 80. A feed rate adjustment member 82 threadably engages clutch arm 72 within the interior of body 19 such that a tip 81 of member 82 rests on a floor 83 of cavity 85 within body 19 that contains the clutch arm therewithin. A feed rate adjustment knob 84 is provided at the top end of member 82, and is accessible to an operator for enabling rotation of member 82 by rotation of knob 84.

In operation, sequential upward and downward movement of push rod 64 along axis 66 (as a result of rotation of the feed body and the operation of the cam member and push rod 58) imparts a sequential pivotal motion to clutch mechanism 69 about a pivot axis 70. In particular, upward movement of push rod 64 causes upward (counter clockwise) movement of the clutch arm 72 in a direction 74 such that the clutch arm pivots about pivot axis 70 and thereby imparts rotational motion to the pinion mechanism 76 attached to clutch mechanism 69. Inward movement of push rod 64 allows spring 79 to downwardly bias clutch arm 72 to move in direction 80 wherein the clutch arm imparts no motion to pinion 76. Such downward movement of the clutch arm places the clutch arm in a position for the next upward movement of push rod 64 and, accordingly, positions the clutch arm to effect the next rotational motion of pinion mechanism 76.

As noted hereinabove, member 82 is threaded within clutch arm 72 such that turning member 82 to adjust the relative amount of tip 81 that protrudes below the bottom of the clutch arm thereby limits the maximum extent of travel of the clutch arm about pivot axis 70 within cavity 85. Specifically, as clutch arm 72 is raised higher, i.e., away from floor 83 of cavity 85, by clockwise turning of feed rate adjustment knob 84 to extend tip 81 from clutch arm 72, second push rod 64 is in contact with the clutch arm only through a portion of the push rod's linear stroke. The resulting lesser stroke of clutch arm 72 reduces the feed rate of turning bar 14. Alternatively, as clutch arm 72 is lowered, i.e., toward floor 83 of cavity 85, by counterclockwise turning of knob 84 to retract tip 81 into clutch arm 72, second push rod 64 is in contact with clutch arm 72 through the entire portion of the push rod's linear stroke. Such maximum upward movement of clutch arm 72 within cavity 85 provides maximum rotation of pinion 76 and a maximum feed rate of turning bar 14. Accordingly, due to clockwise or counterclockwise rotation of adjustment knob 84 and the resulting extension from or retraction into clutch arm 72 of tip 81, which respectively, raises or lowers clutch arm 72 as body 18 rotates, turning bar 14 may be automatically advanced by any desired feed rate. A typical feed rate is between 0 and $^{40}/_{1000}$ths of an inch per revolution of body 18 about spindle 28.

Rotational motion of pinion mechanism 76 in direction 74 causes sliding movement of rack 22 (PIG. 2) in a direction 78 which imparts linear movement to turning bar 14 in direction 78, thereby advancing turning head 12.

In a preferred version of the embodiment of FIGS. 1–4, motor 26 is a 1.22 hp air motor having a 3.8:1 gear reduction mechanism 34. In other embodiments, motor 26 may be an electric motor or may be positioned external of the lathe body 18 as discussed hereinbelow in connection with FIGS. 9 and 10.

The push rods preferably comprise rigid elongate cylinders approximately 2.5 inches in length and 0.25 inches in diameter. The rods have rounded ends that meet one another at a connection point 68 within recess 169 such that linear motion of push rod 58 along axis 60 effects linear movement of push rod 64 along axis 66 even though axes 60 and 66 are not linearly aligned. In other embodiments, the push rods may be elongate flexible members that move through a curved bore along a curved path of movement.

Figure 6:
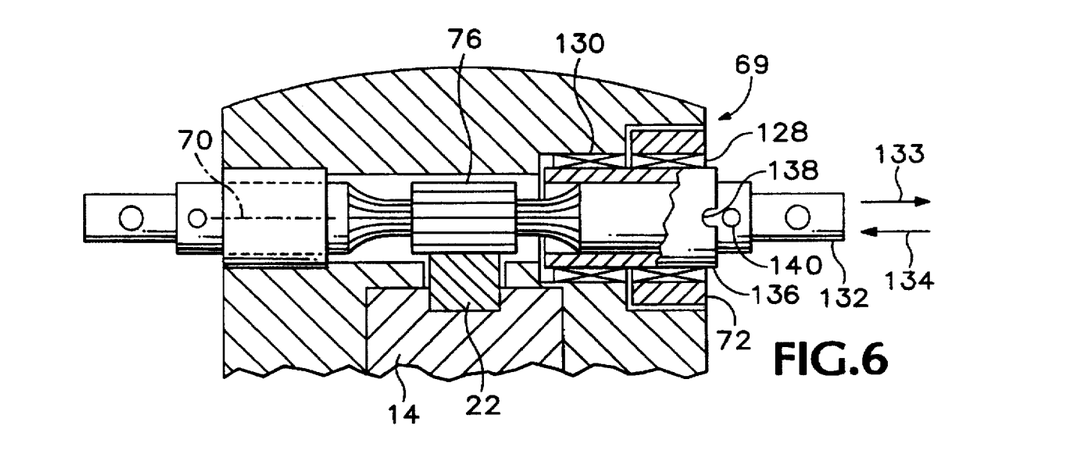
FIGS. 6 and 7 are partial cross-sectional front views along line 6—6 of FIG. 1 of the rack and pinion mechanism with the clutch shaft in the disengaged and engaged position, respectively.
Figure 7:
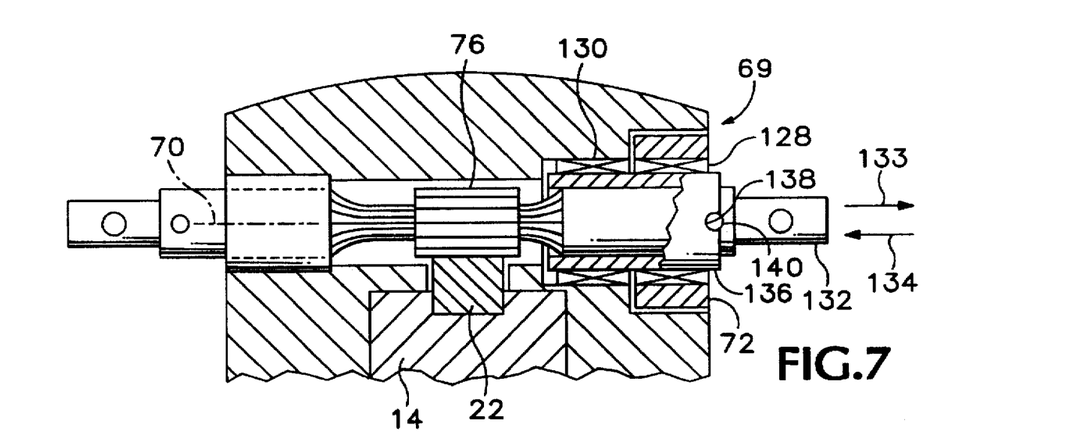

Referring now to FIGS. 6 and 7, which are cross-sectional views illustrating the clutch mechanism in disengaged and engaged configurations respectively, the connection between clutch mechanism 69 and pinion mechanism 76 may be observed. Clutch mechanism 69 comprises a first one-way clutch 128, a second one-way clutch 130 positioned next to clutch 128, and a feed shaft 132 positioned through one-way clutch devices 128 and 130 and being operable for movement in directions 133 and 134 along pivot axis 70. Clutch mechanism 69 further comprises a shaft sleeve 136 including a notch 138 which is adapted to receive therein a pin 140 which extends through feed shaft 132. Clockwise movement of clutch arm 72 (i.e., as clutch arm 72 moves upwardly) results in clockwise rotation of sleeve 136. As shown in FIG. 6, movement of feed shaft 132 in direction 133 positions pin 140 outwardly of aperture 138 such that rotational movement of clutch arm 72 and the corresponding rotation of sleeve 136 do not impart movement to feed shaft 132, since pin 140 is not engaged in aperture 138. Accordingly, linear motion is not imparted to rack 22 as a result of movement of the body 18 and the various push rods. In the configuration of FIG. 6, manual movement of the turning bar is accomplished by use of a handle 35 (FIG. 9) which is attachable to feed shaft 132 and manually rotated. An illustrative handle is shown FIG. 9 as discussed hereinbelow.

As shown in FIG. 7, movement of feed shaft 132 in direction 134 positions pin 140 within aperture 138 such that rotational movement of feed shaft 132 about pivot axis 70 is imparted by the movement of clutch arm 72 and sleeve 136, resulting in feeding of the turning bar in the direction of arrow 78 (FIG. 2).

Figure 8:
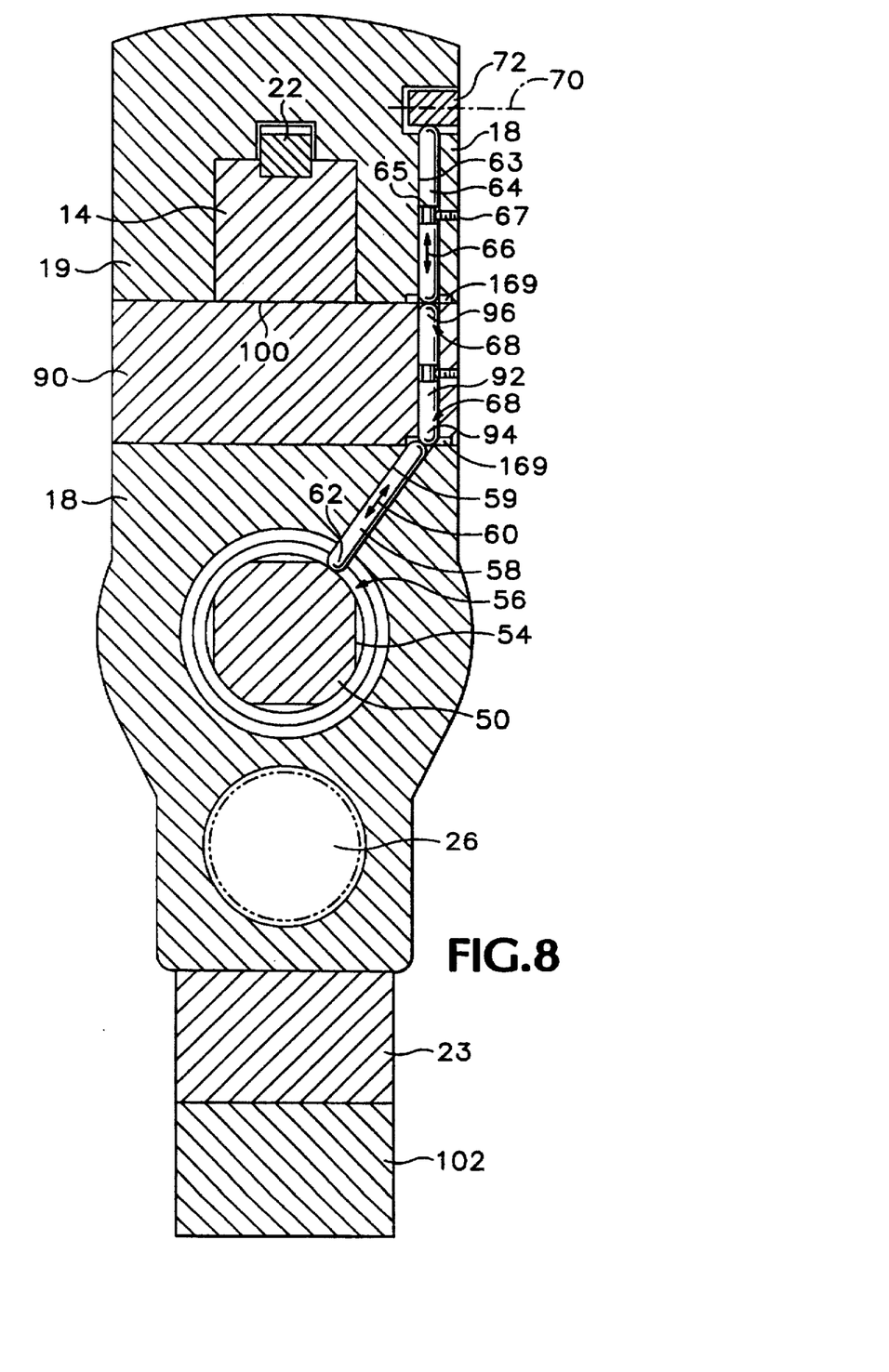
FIG. 8 is a cross-sectional front view of another embodiment of the portable lathe including a spacer block and a counterweight.

Referring to FIG. 8, a cross-sectional view of another embodiment of the portable lathe, it will be observed that the present invention is modular in construction and is adaptable to move turning head 12 radially outwardly from spindle 28 by attaching spacer blocks 90 on body 18 by use of head screws (not shown). Spacer block 90 includes a spacer block push rod 92 which includes a first end 94 in contact with first push rod 58 and a second end 96 in contact with second push rod Spacer block push rod is suitably contained within a substantially vertical bore within the spacer block. In this manner, linear movement of push rod 58 is imparted to push rod 64 through movement of push rod 92 positioned therebetween.

Spacer block 90 is preferably placed between bar support body 19 and the main body portion 18 such that the spacer block is positioned along the bottom portion 100 of turning bar 14. An additional counterweight 102 preferably is employed opposite spacer block 90 across spindle 28 to maintain the apparatus in balance for precision turning operations. Counterweight 102 is typically secured to counterweight 23 by use of mounting bolts (not shown).

In other embodiments, plural spacer blocks, each including a spacer block push rod, may be employed to transfer motion of central push rod 58 to outer push rod 64. Use of such spacing blocks allows use of the portable lathe 10 to turn surfaces in a variety of sizes while still permitting adjustment of the turning bar feed rate.

Referring again to FIG. 1, the lathe suitably is manufactured in a compact design such that the body is approximately 10 inches long measured along length dimension 142, approximately 14 inches high measured along height dimension 144, and approximately 6 inches wide measured along width dimension 146. Such a compact design facilitates machining of surfaces without requiring a substantial volume of free space adjacent to the work piece. Furthermore, due to its compact size, the device is easily transported to a work site.

Body 18 and body 19 are preferably manufactured of anodized aluminum for lightweight durability. First push rod 58, spindle 28, and cam member 50 are preferably manufactured of hardened steel to prevent wear and tear. Rack-and-pinion mechanism 22 and 76, second push rod 64 and spacer block push rods 92 are preferably manufactured of carbon steel for durability. Turning bar 14 is also carbon steel. Any appropriate material, however, may be utilized.

Figures 9, 10:
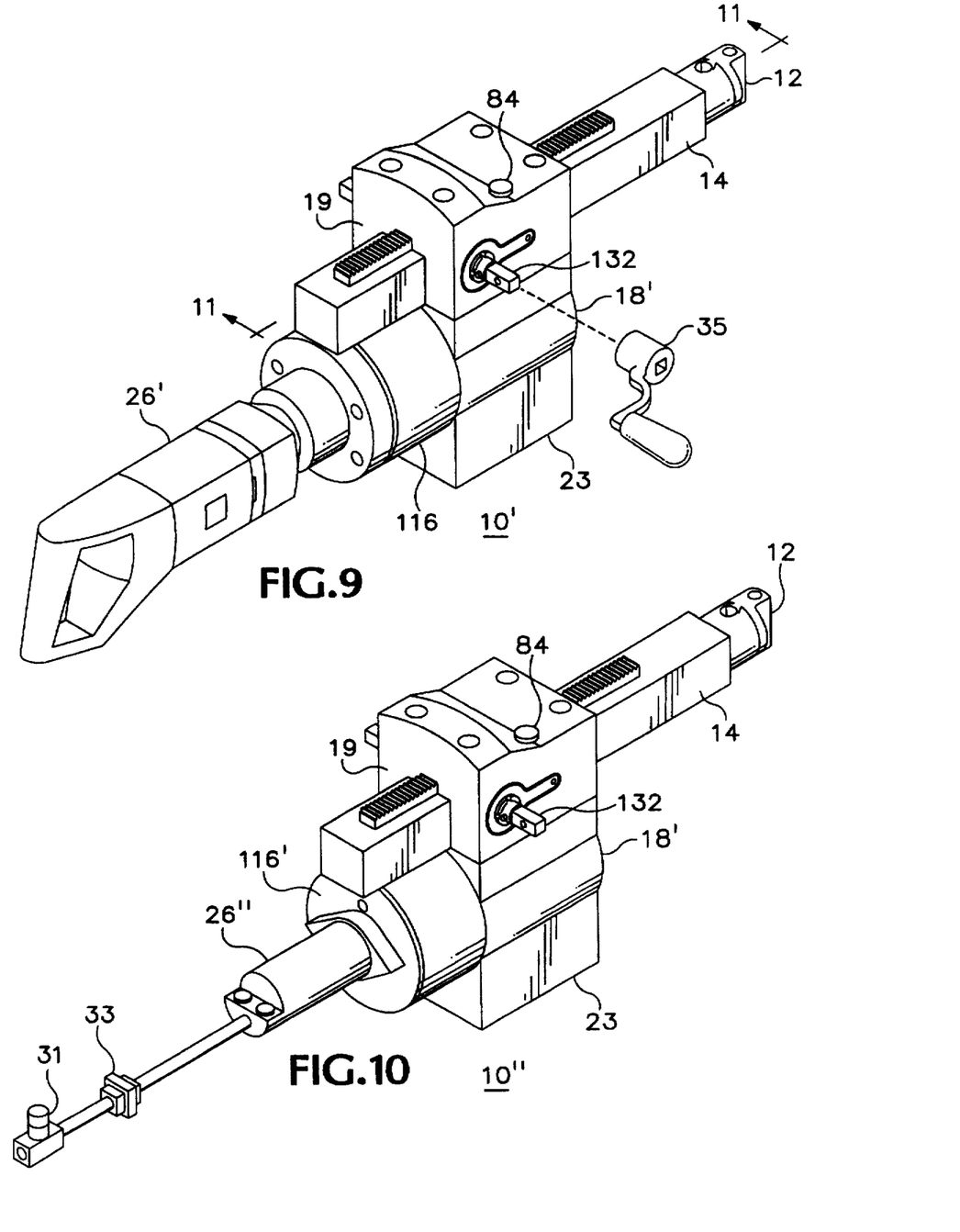
FIG. 9 is an isometric front view of a preferred embodiment of the portable lathe according to the present invention wherein the drive motor is external of the lathe body.
FIG. 10 is an isometric front view of an embodiment of the portable lathe of FIG. 9 employing an external air drive motor.

In a preferred embodiment of the portable lathe, an external motor is employed, which may be an electric motor, as show with reference to FIG. 9, or an air motor, as show with reference to FIG. 10. Referring to FIG. 9, an isometric front view of a portable lathe 10' with an external electric motor, lathe 10' comprises a slightly more compact main body 18' (as compared with main body 18 of FIG. 1). Attached thereto is planetary housing assembly 116, which receives electric motor 26' thereon in mounting relation. Motor 26' provides driving power to operate the lathe as discussed hereinbelow in conjunction with FIG. 11. A handle 35 as show in FIG. 9 is adapted to fit over feed shaft 132. When feed shaft 132 is positioned as in FIG. 6, with pin 140 not engaging sleeve 136, handle 35 is suitably employed to rotate feed shaft 132 and accordingly to rotate pinion 76 attached thereto. Manual feeding of the turning bar may thereby be accomplished.

The external motor embodiment of FIG. 9 may suitably be configured with an air motor 26" as illustrated in PIG. 10. The air motor embodiment 10" includes needle valve 31 which is positioned between the pneumatic supply and air motor 26". An emergency shut off valve 33 is also desirable in the pneumatic supply line to enable rapid removal of power to the lathe in the event of an emergency.

Figure 11:
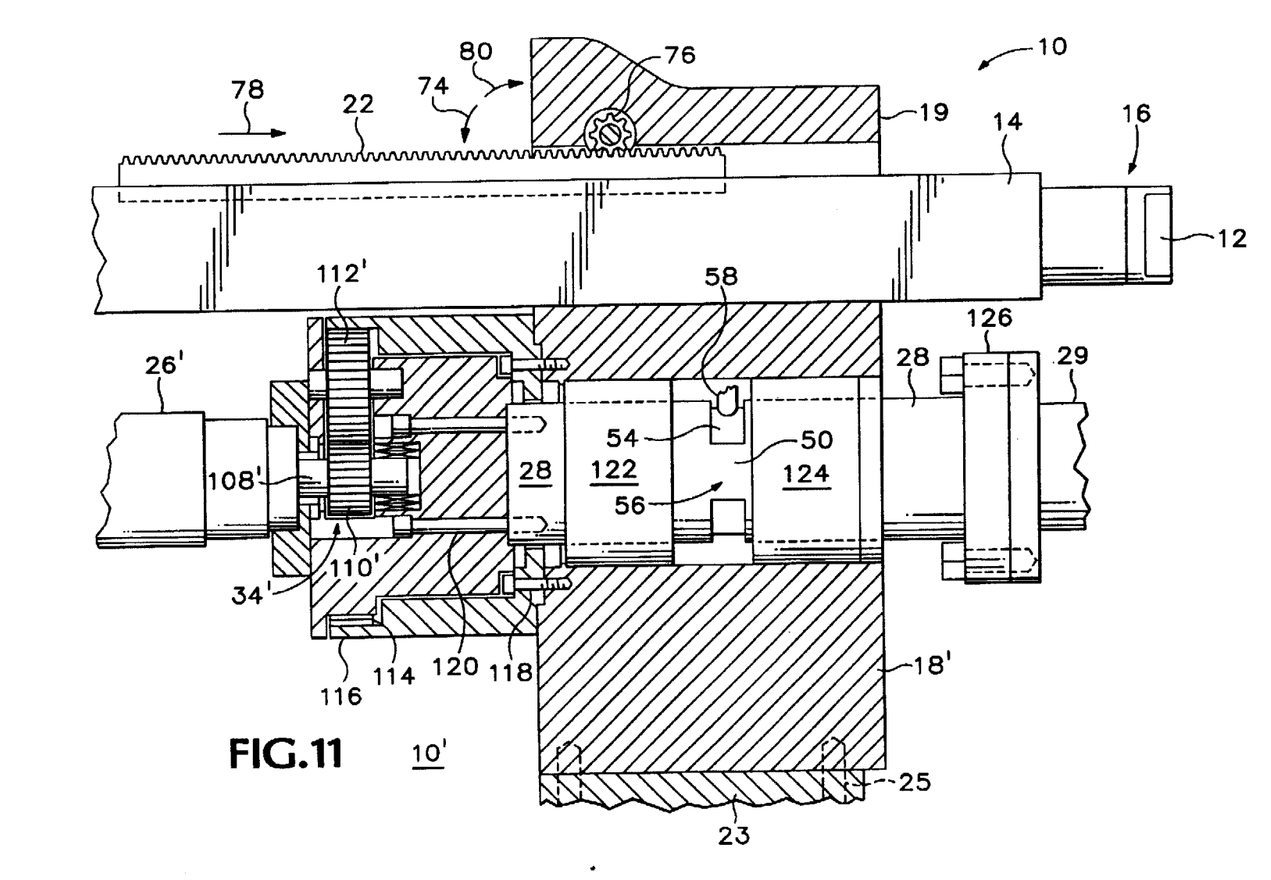
FIG. 11 is a partial cross-sectional side view of the portable lathe of FIG. 9, mounted to a shaft for turning, taken along line 11—11 of FIG. 9.

Referring to FIG. 11, a partial cross-sectional view of portable lathe 10' taken along line 11—11 of FIG. 9, motor 26' suitably includes a motor shaft 108' operatively connected to gear reduction mechanism 34'. Gear reduction mechanism 34' includes a motor shaft gear 110', an idler gear 112' and a ring gear 114, all contained within planetary housing 116. Ring bolts 118 attach to body 18', and housing bolts 120 attached to spindle 28. Accordingly, rotation of motor 26' is translated to rotary movement of the lathe about spindle 28. Mounting of air motor 26" is accomplished in a corresponding manner.

Therefore, the present invention provides plural embodiments of improved portable lathes which are adapted to provide either manual or automatic tool feeding. When automatic feeding is enabled, a feed rate adjustment allows the rate of feed to be varied over a wide range as may be required by the particular situation.

While plural embodiments of the present invention have been shown and described, it will be apparent to those skilled in the art that many further changes and modifications may be made without departing from the invention in its broader aspects. The appended claims are therefore intended to cover all such changes and modifications as fall within the true spirit and scope of the invention.

I claim:

1. A portable turning machine comprising:
   a body rotatably mounted on a central shaft including a stationary cam member having at least one contact surface;
   a push rod positioned within the body and adjacent the cam member such that as the body rotates the push rod sequentially engages the at least one contact surface and is moved back and forth along a push rod axis of movement;
   a clutch mechanism pivotally mounted on the body and including a clutch arm connected to a pinion mechanism and having a pivot point, the clutch arm being operatively connected to the push rod such that as the push rod is moved back and forth the clutch arm is pivoted back and forth about the pivot point thereby rotating the pinion mechanism; and
   a tool bar slidably mounted on the body and including a rack mechanism operatively connected to the pinion mechanism such that rotation of the pinion mechanism causes sliding movement of the tool bar along a tool bar axis of movement.

2. A portable turning machine according to claim 1 comprising at least one additional push rod positioned end-to-end between the cam member and the clutch mechanism such that the cam member causes linear movement of the push rod and the at least one additional push rod so as to pivot the clutch arm thereby causing the tool bar to slide along the tool bar axis of movement.

3. A portable turning machine according to claim 1 further comprising a spacer block operatively connected to the body and including an additional push rod positioned therein such that the push rod and the additional push rod are positioned end-to-end between the cam member and the clutch mechanism such that the cam member causes linear movement of the push rod and the additional push rod so as to pivot the clutch arm and thereby cause the tool bar to slide along the tool bar axis of movement.

4. A portable turning machine according to claim 1 wherein a cutting tool is mounted on the tool bar.

5. A portable turning machine according to claim 1 wherein the push rod is an elongate cylinder having rounded ends.

6. A portable turning machine according to claim 1 wherein the cam member is multiple lobed in shape.

7. A portable turning machine according to claim 1 further comprising a feed rate adjustment member that regulates the pivoting movement of said clutch arm thereby regulating the sliding movement of the tool bar along the tool bar axis of movement.

8. A portable turning machine according to claim 1 further comprising disengagement means for disconnecting the clutch mechanism from imparting motion to the tool bar.

9. A portable lathe comprising:
   a tool bar including a rack member, said tool bar adapted for mounting a tool thereon and being movable along a tool bar axis;
   a clutch mechanism including a pivot point, a clutch arm that pivots about said pivot point, and a pinion mechanism connected to the clutch arm and engaging said rack member so as to cause the tool bar to move along the tool bar axis as the clutch arm pivots;
   a frame adapted for rotation about a central axis and supporting the tool bar and the clutch mechanism, the frame including a cam member having at least one contact surface and a first push rod adapted for linear movement along a first push rod axis between the clutch mechanism and the cam member; and
   a motor that rotates the frame about the central axis such that the first push rod engages in succession the at least one contact surface thereby causing repeated linear movement of the first push rod along the first push rod path of movement so as to effect repeated pivotal movement of the clutch arm and cause the tool bar to move along the tool bar axis.

10. A portable lathe according to claim 9 further comprising a second push rod adapted for linear movement along a second push rod axis and being positioned end-to-end between the first push rod and the clutch mechanism such that said repeated linear movement of the first push rod along the first push rod axis causes repeated linear movement of the second push rod along the second push rod axis so as to pivot the clutch arm and cause the tool bar to move along the tool bar axis.

11. A portable lathe according to claim 9 further comprising a spacer block operatively connected to the frame and including a second push rod positioned therein such that the first and second push rods are positioned end-to-end between the cam member and the clutch mechanism such that the cam member causes repeated linear movement of the first and second push rods so as to pivot the clutch arm and thereby cause the tool bar to move along the tool bar axis.

12. A portable lathe according to claim 9 wherein a cutting tool is mounted on the tool bar.

13. A portable lathe according to claim 9 wherein the first push rod is an elongate cylinder having rounded ends.

14. A portable lathe according to claim 9 wherein the cam member is substantially multiple lobe shaped.

15. A portable lathe according to claim 9 further comprising a feed rate adjustment member that regulates pivotal movement of said clutch arm thereby regulating the movement of the tool bar along the tool bar axis.

16. A portable lathe according to claim 15 wherein the feed rate adjustment member threadably engages the clutch arm such that turning the adjustment member regulates the extent of pivotal movement of the clutch arm.

17. A portable lathe according to claim 9 further comprising disengagement means for disconnecting the clutch mechanism from imparting motion to the tool bar.

18. A portable turning machine comprising:
   support means for supporting a tool means, the support means being rotatably mounted on turning means for turning the support means and including cam means for providing camming action and having at least one contact thereon;
   translation means for providing translational motion and being positioned within the support means and adjacent the cam means such that as the support means rotates the translation means sequentially engages the at least one contact and is moved along a translation axis;
   transfer means for transferring motion and being mounted on said support means and operatively connected to rotation means adapted for providing rotational motion, said transfer means transferring said motion of said translation means into motion of said rotation means; and
   bar means adapted for holding the tool means for operating on a workpiece and being operable for sliding movement relative to the support means, said bar means operatively connected to the rotation means such that motion of the rotation means causes movement of the bar means relative to the support means.

19. A portable turning machine according to claim 18 comprising at least one additional translation means for providing translational motion and being positioned between the cam means and the transfer means such that the cam means causes movement of the translation means and the at least one additional translation means so as to cause motion of said rotation means and thereby cause movement of said bar means.

20. A portable turning machine according to claim 18 further comprising spacing means for spacing said bar means from said turning means and being operatively connected to the support means and including an additional translation means for providing translational motion and being positioned therein such that the translation means and the additional translation means are positioned end-to-end between the cam means and the transfer means such that the cam means causes movement of the translation means and the additional translation means so as to cause motion of the rotation means and thereby cause movement of the bar means.

21. A portable turning machine according to claim 18 wherein the tool means is for turning a surface and is mounted on the bar means.

22. A portable turning machine according to claim 18 wherein the translation means is an elongate cylinder having rounded ends.

23. A portable turning machine according to claim 18 wherein the cam means is a substantially multiple lobe shaped cam member.

24. A portable turning machine according to claim 18 further comprising feed rate adjustment means for regulating the motion of said rotation means thereby regulating the movement of the turning means.

25. A portable turning machine according to claim 18 further comprising disengagement means for disengaging the bar means from the rotation means.

* * * * *